US009264416B2

(12) United States Patent
Vikberg et al.

(10) Patent No.: US 9,264,416 B2
(45) Date of Patent: Feb. 16, 2016

(54) UE ACCESS TO CIRCUIT SWITCHED-BASED MOBILE TELEPHONY SERVICES USING A FIXED WIRELESS TERMINAL

(75) Inventors: Jari Vikberg, Jarna (SE); Tomas Nylander, Värmdö (SE); Håkan Olofsson, Stockholm (SE)

(73) Assignee: TELEFONAKTIEBOLAGET L M ERICSSON, Stockholm (SE)

( * ) Notice: Subject to any disclaimer, the term of this patent is extended or adjusted under 35 U.S.C. 154(b) by 46 days.

(21) Appl. No.: 14/006,443

(22) PCT Filed: Mar. 23, 2011

(86) PCT No.: PCT/SE2011/050325
§ 371 (c)(1),
(2), (4) Date: Sep. 20, 2013

(87) PCT Pub. No.: WO2012/128684
PCT Pub. Date: Sep. 27, 2012

(65) Prior Publication Data
US 2014/0013392 A1 Jan. 9, 2014

(51) Int. Cl.
*H04L 29/06* (2006.01)
(52) U.S. Cl.
CPC ............ *H04L 63/08* (2013.01); *H04L 63/0428* (2013.01)
(58) Field of Classification Search
None
See application file for complete search history.

(56) References Cited

U.S. PATENT DOCUMENTS

| 6,757,823 | B1* | 6/2004 | Rao et al. ................ 713/153 |
| 8,121,037 | B2* | 2/2012 | Balasubramanian et al. 370/235 |
| 2007/0177585 | A1 | 8/2007 | El Mghazli et al. |
| 2009/0023442 | A1* | 1/2009 | Ahmed et al. ............ 455/426.2 |
| 2009/0156213 | A1 | 6/2009 | Spinelli et al. |
| 2010/0128677 | A1 | 5/2010 | Liu et al. |
| 2010/0290437 | A1 | 11/2010 | Wang et al. |
| 2010/0291897 | A1 | 11/2010 | Ghai |
| 2012/0023241 | A1* | 1/2012 | Goel et al. ................ 709/228 |

OTHER PUBLICATIONS

3rd Generation Partnership Project; Technical Specification Group GSM/EDGE Radio Access Network; Generic Access Network (GAN); Stage 2 (Release 10). 3GPP Standard; 3GPP TS 43.318. 3rd Generation Partnership Project (3GPP). Mobile Competence Centre ; 650. Route Des Lucioles ; F-06921 Sophia-Antipolis Cedex; France. no. V10.o.o. Dec. 21, 2010 (Nov. 2010).
International Search Report for PCT/SE2011/050325, mailed Dec. 7, 2011.
Written Opinion of the International Searching Authority for PCT/SE2011/050325, mailed Dec. 7, 2011.

* cited by examiner

*Primary Examiner* — Benjamin Lanier
(74) *Attorney, Agent, or Firm* — Patents on Demand, P.A.; Brian K. Buchheit; Scott M. Garrett

(57) ABSTRACT

A fixed wireless terminal (FWT) (12) identifies a request from a mobile radio user equipment (UE) (38) for a circuit-switched mobile telephony, service provided by a circuit-switched mobile core network (32). In response to the request, the FWT provides an internet protocol (IP) connection between the mobile UE and a generic access network controller (44) via a packet-switched (PS) mobile network (42) that includes a radio base station. The IP connection and the generic access network controller provide the mobile UE access to the circuit-switched mobile telephony service provided by the circuit-switched mobile core network.

23 Claims, 7 Drawing Sheets

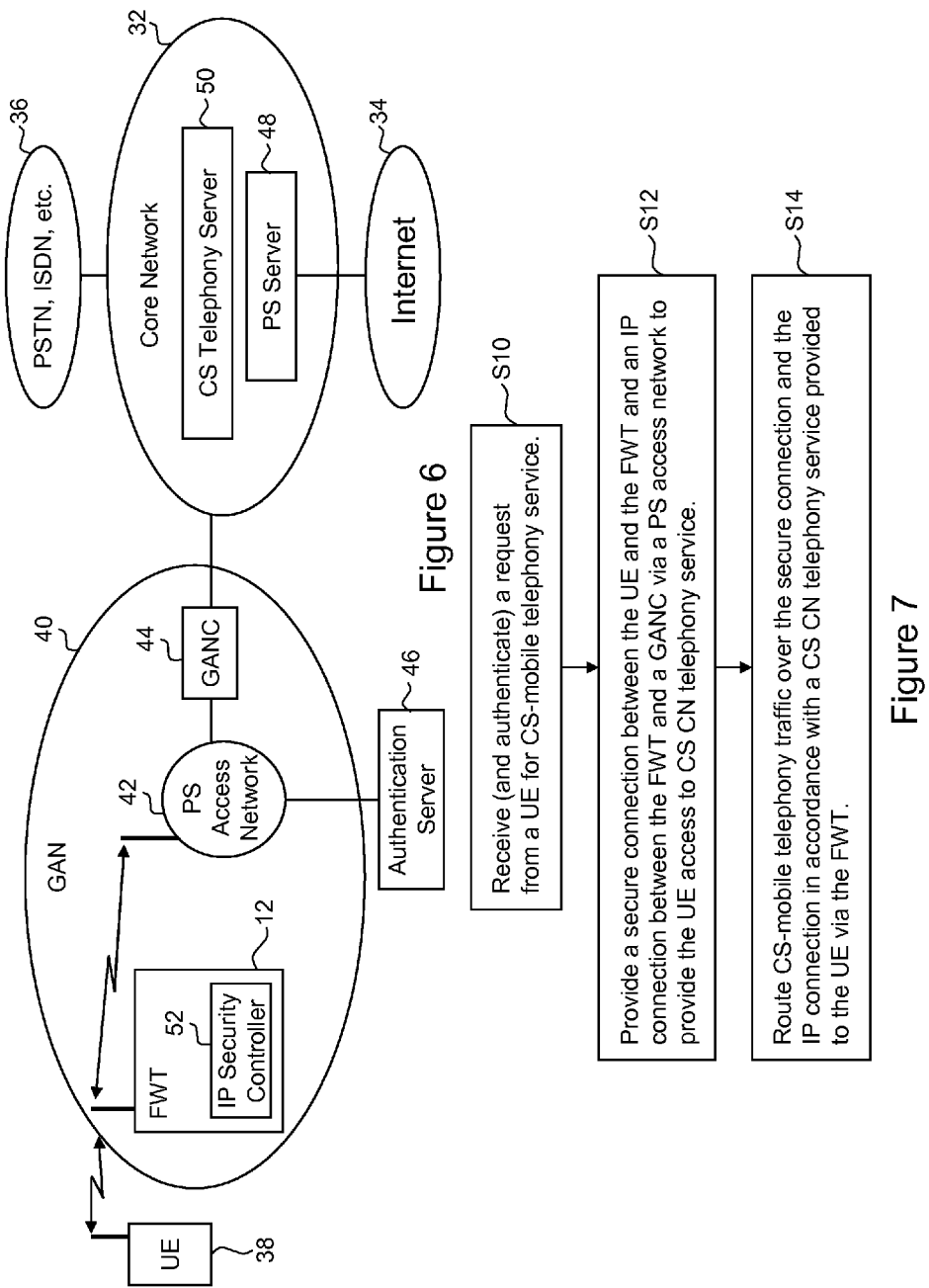

UE ACCESS TO CIRCUIT SWITCHED-BASED MOBILE TELEPHONY SERVICES USING A FIXED WIRELESS TERMINAL This application is the U.S. national phase of International Application No. PCT/SE2011/050325, filed 23 Mar. 2011, which designated the U.S., the entire contents of which is hereby incorporated by reference.

TECHNICAL FIELD

The technology relates to communications, and in particular, to Fixed Wireless Terminals (FWTs).

BACKGROUND

The technology described in this application relates to Fixed Wireless Access (FWA) and Fixed Wireless Terminals (FWT). Another name for FWT is Mobile Broadband Router (MBR). FWA provides an end user with fixed line services by utilizing a wireless technology, e.g., GSM, UMTS/HSPA/WCDMA, SAE/LTE, CDMA or WiMAX technologies. Fixed Wireless Terminals offer, for example, a cost efficient way to provide high speed data, voice, and fax services to small office/home office and residential users. The following description typically refers to the SAE/LTE technology as an example of wireless technology providing the backhaul connection to core and other networks. However, the technology may also be applied other access technologies like UMTS/HSPA/WCDMA and WiMAX.

A FWT device is for example located in an end user's home or office, normally in the same location all the time. There is no real mobility related to the FWT itself except "nomadicity" where the FWT could be powered off in one place, moved to another location and then powered on again. The FWT provides local connectivity and services for end user equipment located in the home using for example WLAN/WiFi or Ethernet as the media. In addition, the FWT may provide support for multiple legacy services. For example, a black phone (a good old fixed phone) or a fax can be connected to the FWT. The FWT is directly connected to the mobile operator's radio access and core networks and can for example provide access towards the Internet.

The technology also relates to a Generic Access Network (GAN) based on Unlicensed Mobile Access (UMA) specifications. GAN provides a new Radio Access Network (RAN) and includes Generic Access Network Controller (GANC). GAN is specified in the 3GPP TS 43.318 and TS 44.318. In GAN, a mobile station (MS) is a dual-mode, dual radio handset including for example both WiFi and 3GPP-macro radio support (GSM, WCDMA or both). The MS connects to a WiFi Access point (AP) using the WiFi radio and can also function in a GAN mode to access cellular radio services, e.g., provided by the GSM CN (Core Network).

Wireless access technologies, as opposed to wired technologies like Ethernet, will likely be used in the future in the home LAN, e.g., between the FWT and the home devices). WLAN/WiFi (e.g., the different variants of IEEE 802.11) will likely become a commodity in mobile terminals. As a result, the FWT device can be used to access Packet Switched (PS) services for mobile terminals. But known FWT solutions or products do not provide mobile terminals with the ability to use the FWT device and the Home LAN for mobile telephony. In other words, there is no way for the mobile terminal to access the mobile telephony services provided by the Circuit-Switched (CS) Core Network (CN), (e.g., a mobile switching center (MSC) node). This is a significant limitation of the FWT-based configurations because the existing CS CN services will likely be used for a very long time in the mobile networks as Voice-Over-Packet-Switched (PS) domain services (like IP Multimedia Services (IMS)) are still in their infancy. Accordingly, providing CS-domain based mobile telephony services as an integrated part of the FWT solutions is important for end users, mobile operators, and vendors.

Different approaches might be taken to allow mobile terminals to access and use CS-based mobile telephony CN services using FWT. For example, a UE could use IMS/SIP-signaling with the FWT, and the FWT could interwork that IMS/SIP-signaling with a CS-based mobile telephony service. A disadvantage with is approach is that the FWT services provided to the UE when in the IMS/SIP domain would be different from the services provided from the 3GPP CS domain. Any service interworking between an IMS/SIP-domain and the 3GPP CS domain is likely to be difficult to support in a transparent way. Another possible approach is to use a 3GPP macro network for CS access and FWT for data access. Drawbacks here include issues with the indoor voice coverage and the UE's simultaneous connection to both the 3GPP macro network and the local FWT network. The latter issue has a significant impact on UE battery lifetime. A better approach would be to connect simply to one of these networks at a time.

SUMMARY

The technology allows mobile terminals to access and use CS-based mobile telephony CN services using a fixed wireless terminal (FWT), e.g., when the mobile terminal is in a residence, office, or other area having an FWT. An FWT identifies a request from a mobile radio user equipment (UE) for a circuit-switched mobile telephony, service provided by a circuit-switched mobile core network. In response to the request, the FWT provides an internet protocol (IP) connection between the mobile UE and a generic access network controller via a packet-switched (PS) mobile network that includes a radio base station. The IP connection and the generic access network controller provide the mobile UE access to the circuit-switched mobile telephony service provided by the circuit-switched mobile core network.

In one non-limiting example embodiment, the request is authenticated, and thereafter, a secure IP connection between the FWT and the UE is provided as part of the IP connection. The FWT includes a secure gateway connected to the secure IP connection with the UE and to a remaining part of the IP connection with the generic access controller. The secure IP connection in one example implementation is an IPsec tunnel, and the secure gateway terminates the IPsec tunnel from the mobile UE. The secure gateway may authenticate the IPsec tunnel. The secure gateway determines whether the request corresponds to a request for an IPsec tunnel from the mobile UE to the generic access controller, and if so, the secure gateway provides the IPsec tunnel between the mobile UE and the FWT. The secure gateway provides an IP security connection separate from the IP connection from the secure gateway to an authentication server coupled to the packet-switched (PS) mobile network. The secure gateway also routes data packet traffic between the secure connection and the remaining part of the connection.

In another non-limiting example embodiment, the identifying step may be based on the FWT being addressed by the UE as a secure gateway associated with the IP connection with the UE.

In another non-limiting example embodiment, the identifying step is based on the FWT intercepting a request to a secure gateway associated with the IP connection with the UE.

In another non-limiting example embodiment, prior to providing the IP connection, the FWT performs an attach operation to attach to the packet-switched network in which the FWT identifies itself as an FWT device.

The packet-switched (PS) mobile network may be one that is based on a 2G, 3G, or 4G cellular wireless standard.

BRIEF DESCRIPTION OF THE DRAWINGS

FIG. 6 is a function block diagram showing another example embodiment of a communications system where a UE accesses circuit switched-based services from a core network node using a fixed wireless terminal;

FIG. 7 is a non-limiting flowchart illustrating example procedures where a UE accesses circuit switched-based services from a core network node using a fixed wireless terminal in accordance with the example embodiment shown in FIG. 6;

DETAILED DESCRIPTION

Figure 1:
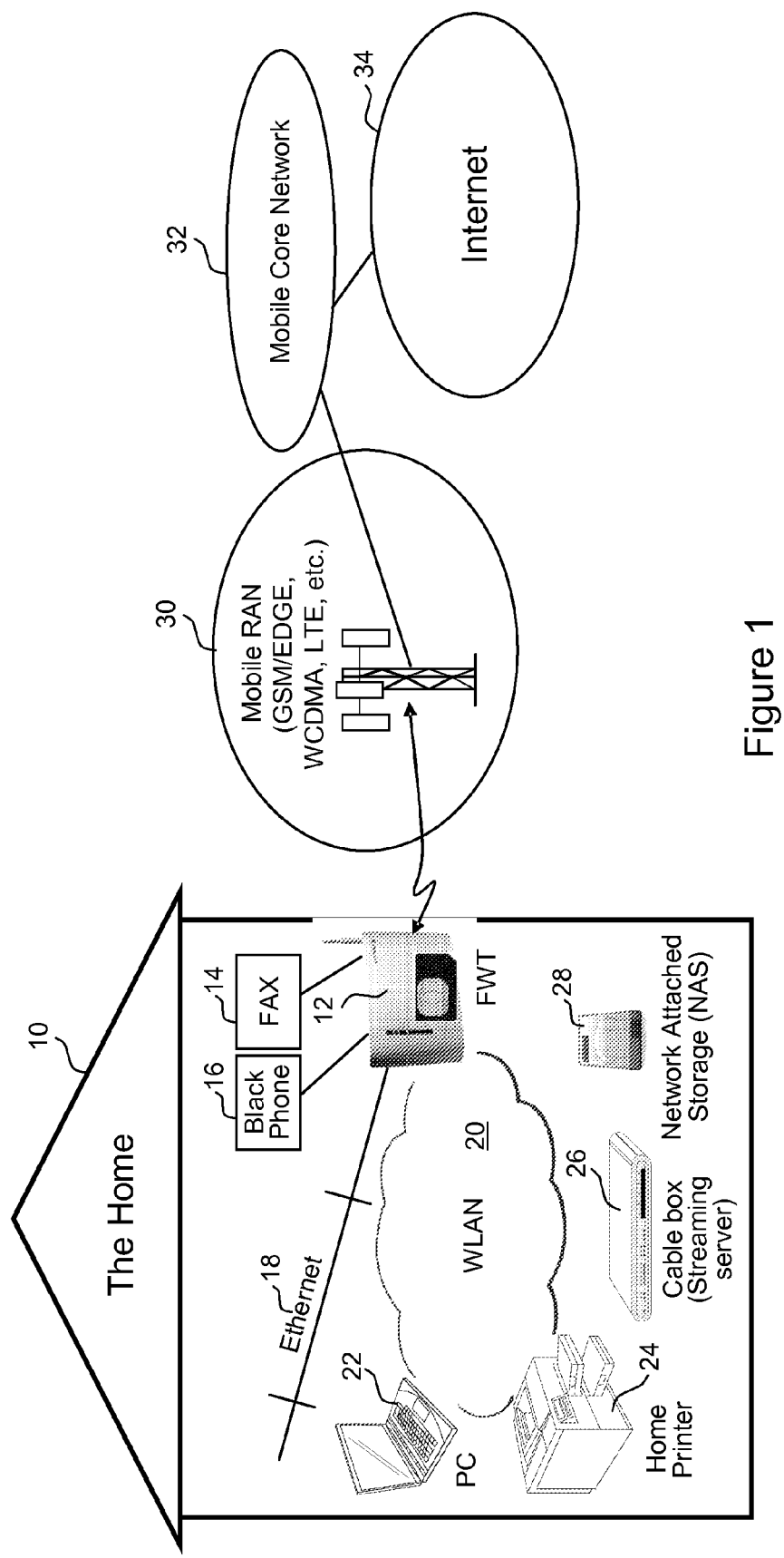
FIG. 1 is a function block diagram showing an example communications system using a fixed wireless terminal.

The following description sets forth specific details, such as particular embodiments for purposes of explanation and not limitation. But it will be appreciated by one skilled in the art that other embodiments may be employed apart from these specific details. In some instances, detailed descriptions of well known methods, interfaces, circuits, and devices are omitted so as not to obscure the description with unnecessary detail. Individual blocks may be shown in the figures corresponding to various nodes. Those skilled in the art will appreciate that the functions of those blocks may be implemented using individual hardware circuits, using software programs and data in conjunction with a suitably programmed digital microprocessor or general purpose computer, and/or using applications specific integrated circuitry (ASIC), and/or using one or more digital signal processors (DSPs). Nodes that communicate using the air interface also have suitable radio communications circuitry. The software program instructions and data may be stored on computer-readable storage medium, and when the instructions are executed by a computer or other suitable processor control, the computer or processor performs the functions.

Thus, for example, it will be appreciated by those skilled in the art that diagrams herein can represent conceptual views of illustrative circuitry or other functional units. Similarly, it will be appreciated that any flow charts, state transition diagrams, pseudocode, and the like represent various processes which may be substantially represented in computer readable medium and so executed by a computer or processor, whether or not such computer or processor is explicitly shown.

The functions of the various illustrated elements may be provided through the use of hardware such as circuit hardware and/or hardware capable of executing software in the form of coded instructions stored on computer-readable medium. Thus, such functions and illustrated functional blocks are to be understood as being either hardware-implemented and/or computer-implemented, and thus machine-implemented.

In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors or one or more controllers, and the terms computer, processor, and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

The technology may be applied to any cellular communications system and/or network. Herein, a user equipment (UE) is understood to be any type of mobile radio node, e.g., mobile station (MS), mobile terminal, laptop, cell phone, PDA, small base station, sensor, relay, etc. A network node can be, for example, a base station node, relay node, base station control node, network access node, or core network node.

FIG. 1 is a function block diagram showing an example communications system using a fixed wireless terminal (FWT) 12 in a home environment 10 with the FWT 12 coupled for communication with a facsimile 14, a conventional "black phone" 16, an Ethernet connection 18, and a personal computing device 22, printer 24, cable box 26, and network attached storage (NAS) device 28 via a a wireless LAN (WLAN) 20. The FWT 12 is connected to a mobile operator's radio access network 30 (via one or more base stations) and mobile core network(s) 32 that can for example provide access towards the Internet 34. The FWT 12 also contains an (U)SIM card in the same way as mobile handsets and terminals to allow the FWT 12 to connect to the mobile operator's network.

Figure 2:
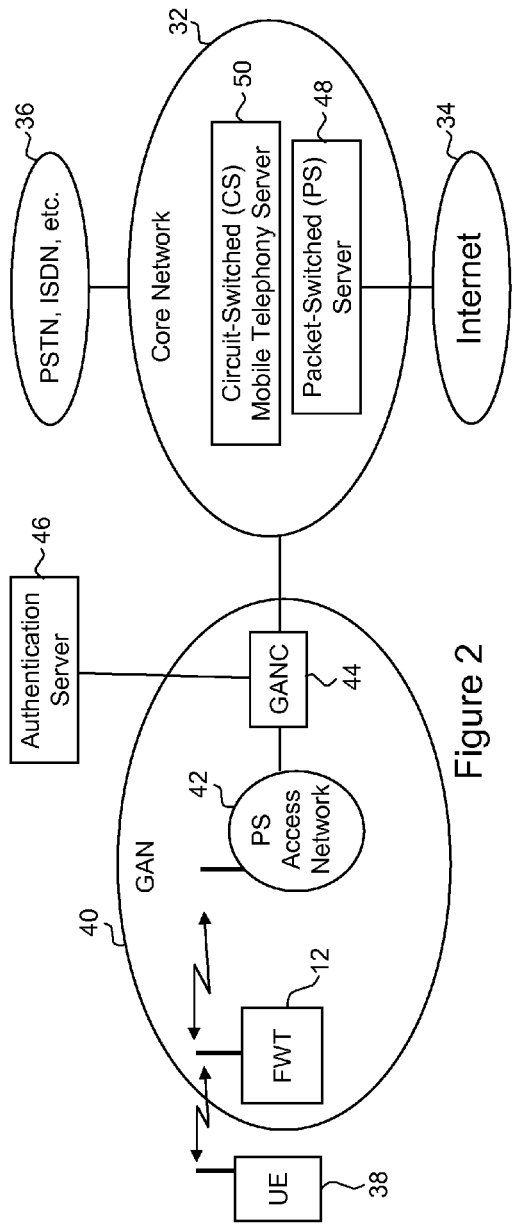
FIG. 2 is a function block diagram showing an example embodiment of a communications system where a UE accesses circuit switched-based services from a core network node using a fixed wireless terminal.

The technology described in this application allows UE mobile terminals to access and use circuit switched (CS)-based mobile telephony core network (CN) services using an FWT, e.g., when the mobile terminal is in a residence, office, or other area having a FWT. Non-limiting examples of CS-based mobile telephony CN services that a UE may want to access include, for example, circuit-switched Short Message Services (SMS) and circuit-switched voice calls. FIG. 2 is a function block diagram showing a non-limiting example embodiment of a communications system where a UE 38 accesses circuit switched-based services from a core network node, e.g., CS mobile telephony server 50, using a fixed wireless terminal 12 located in a generic access network (GAN) 40. The GAN 40 provides a radio access network (RAN) and is specified in the 3GPP TS 43.318 and TS 44.318. The UE 38 may be a dual-mode, dual radio handset including, for example, both WiFi and 3GPP-macro radio support (GSM, WCDMA, or both). The UE 38 connects to the FWT 12 using the WiFi radio. The GAN standard defines for example how the UE can function in a GAN mode using the GANC 44.

The UE 38 communicates over the wireless interface a request for a CS-based mobile telephony CN service to the FWT 12 which communicates the request or another request based on the UE's original request over a wireless interface to a packet-switched (PS) radio access/IP network 42 that is coupled to a GAN controller (GANC) 44. The packet-switched (PS) radio access/IP network 42 includes some sort of radio base station for conducting radio communications with the FWT 12. The GANC 44 is coupled to an authentication server 46 which is used to authenticate the UE 38 to ensure that it is entitled to the requested CS-based mobile telephony CN service. The GANC 44 is also coupled to a core network 32 that includes a CS-mobile telephony server 50 and a packet switched (PS)-mobile telephony server 48. The PS-mobile telephony server 48 is coupled to the Internet 34, and the CS-mobile telephony server 50 is coupled to one or more CS-based networks 36 like the PSTN, ISDN, etc.

Figure 3:
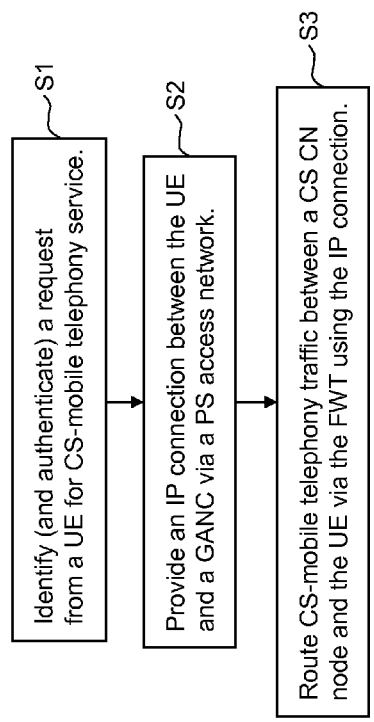
FIG. 3 is a non-limiting flowchart illustrating example procedures where a UE accesses circuit switched-based services from a core network node using a fixed wireless terminal.

FIG. 3 is a non-limiting flowchart illustrating example procedures where the UE 38 accesses a CS-based mobile telephony CN service from a core network node using the fixed wireless terminal 12. Initially, the FWT 12 receives (and preferably authenticates) a request from UE 38 for CS-based mobile telephony CN service (step S1). In response to that request, the FWT 12 provides an IP connection between the UE 38 and a GANC 44 via a PS access network 42 (step S2). Thereafter, the FWT 12 routes CS-mobile telephony traffic between a CS CN node like 50 and the UE 38 via the FWT 12 using the IP connection (step S3).

Figure 4:
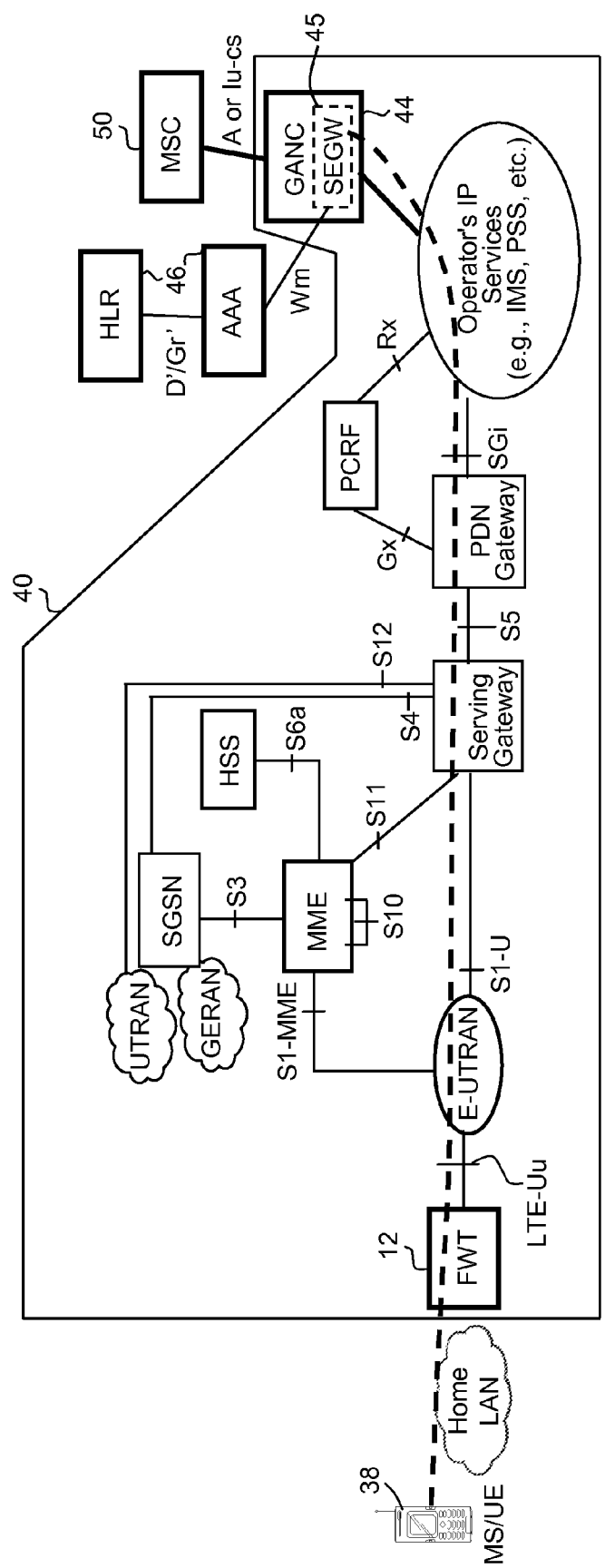
FIG. 4 is a function block diagram showing an example, non-limiting SAE/LTE application of the embodiment associated with FIGS. 2 and 3.

FIG. 4 is a function block diagram showing an example, non-limiting SAE/LTE application of the embodiment associated with FIGS. 2 and 3. The dashed line represents the IP connection between the UE 38 and the GANC 44 via the FWT 12, the E-UTRAN, Serving Gateway, PDN Gateway, Operator's IP Services, to a secure gateway 45 located in this example in the GANC 44 and called a GANC-SEGW 45. The GANC-SEGW 45 is coupled to an authentication server 46 that includes an AAA node and an HLR node and to an MSC core network node 50 that provides the requested CS-based mobile telephony CN service.

Figure 5:
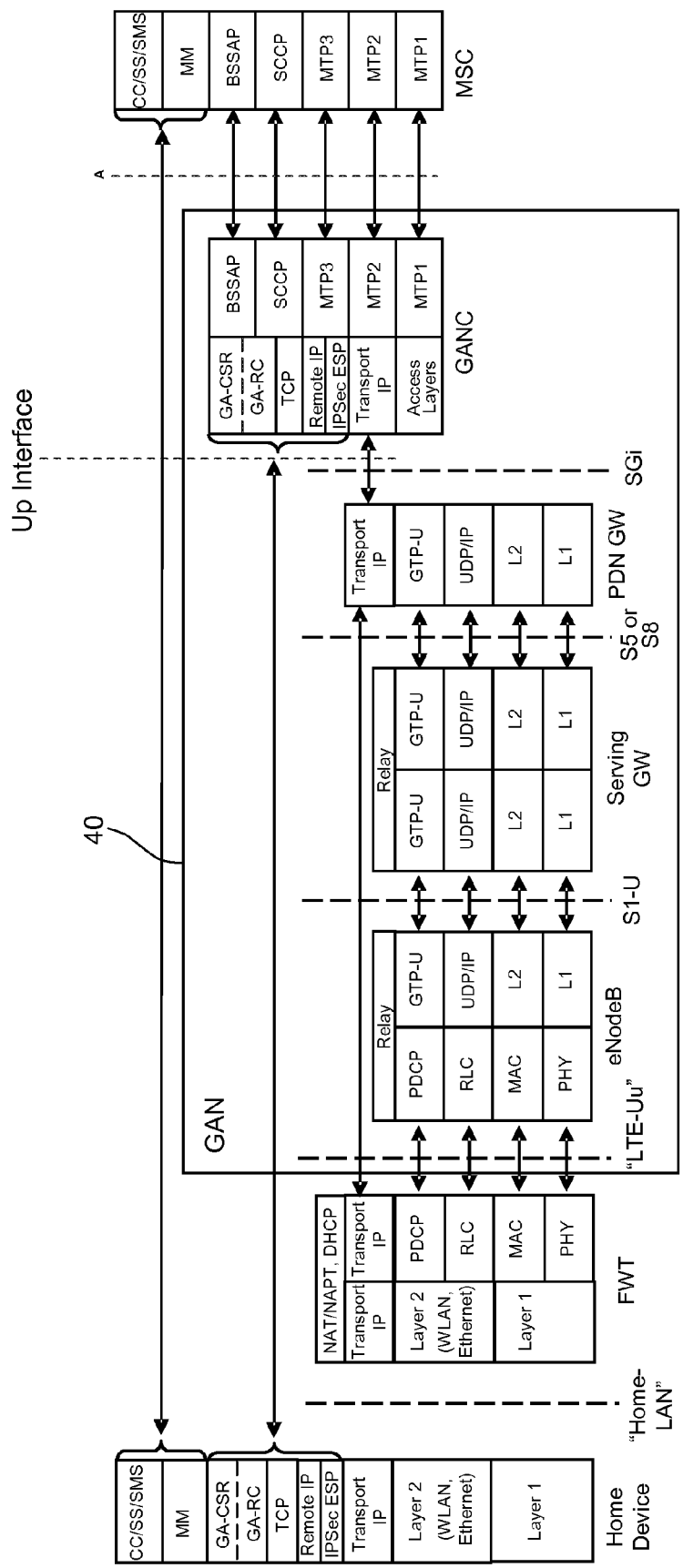
FIG. 5 is a diagram illustrating example protocol stacks associated with the example SAE/LTE application in FIG. 4.

FIG. 5 is a diagram illustrating example protocol stacks associated with the example SAE/LTE application in FIG. 4. This example protocol architecture shows one way for the FWT terminal to connect to the SAE/LTE network and how the other Home Devices are connected to the FWT. For the SAE/LTE network, only the user plane protocols stacks are used when home devices other than the UE use the connectivity provided by the FWT.

The UE 38 may, for example, use a GAN/UMA client application to request and use CS-domain services from the CS-mobile telephony server 50 and wireless LAN technology (e.g., WLAN/WiFi) to directly access and use PS-domain services from the PS-mobile telephony server 48 without any GAN/UMA client. The UE 38 terminal may use GAN/UMA protocols to communicate with the FWT 12 and the GANC 44. The FWT 12 terminates at least some of the GAN protocol signaling to improve the overall efficiency of the communication and in particular for the mobile PS backhaul provided by the FWT device.

A benefit of the example embodiments in FIGS. 4 and 5 is that the FWT 12 may remain unmodified. But these example embodiments also have some drawbacks. The IP security protocol (IPsec) is used between the FWT 12 and the GANC 44 over the mobile backhaul connection. A security gateway (SEGW) is located in the GANC (see FIG. 4) and is the network side of the IP security protocol layer (IPsec), where the mobile terminal includes the UE side of the IPsec layer.

IPsec is a suite of protocols for securing network (IP) connections by authenticating and encrypting each IP packet of a communication session. IPsec establishes mutual authentication between agents at the beginning of the session and negotiation of cryptographic keys to be used during the session. It can be used in protecting data flows between a pair of hosts (host-to-host), between a pair of security gateways (network-to-network), or between a security gateway and a host (network-to-host). IPsec uses Authentication Headers (AH) provide connectionless integrity and data origin authentication for IP datagrams and provides protection against replay attacks. Encapsulating Security Payloads (ESP) provides confidentiality, data origin authentication, connectionless integrity, an anti-replay service (a form of partial sequence integrity), and limited traffic flow confidentiality. Security associations (SA) provide a bundle of algorithms and data that provide the parameters necessary to operate AH and/or ESP operations. IPsec can be implemented in a host-to-host transport mode as well as in a network tunnel mode.

In the GAN, tunnel mode is used where the entire IP packet is encrypted and/or authenticated and then encapsulated into a new IP packet with a new IP header. Tunnel mode is used to create virtual private networks for network-to-network communications (e.g. between routers to link sites), host-to-network communications (e.g. remote user access), and host-to-host communications (e.g. private chat).

A problem stems from the fact that IPsec is not bandwidth optimized which means that the radio interface resources between the FWT 12 and the mobile RAN 30 are not used in an efficient way. One reason for this is that GAN protocols were designed to be run over fixed broadband connections instead of FWT devices and mobile broadband connections. Given that the IPsec "tunnel mode" is used in the GAN 40, there is significant protocol signaling overhead. For example, a single mobile voice connection of 12.2 Kbps will result in ~60 Kbps after the IPsec and GAN protocol overhead are included depending also on how many AMR/voice frames are included in each IP/IPsec packet. The number of voice frames in each IP/IPsec packet dramatically impacts the total bandwidth needed. For example, if a single voice frame is included in each IP/IPsec packet, then the largest total bandwidth is needed. Lower bandwidth can be achieved by including multiple voice frames in each IP/IPsec packet, but in this case, additional delay is introduced in the voice communication.

These drawbacks are overcome in the following non-limiting, example embodiments. FIG. 6 is a function block diagram showing another example embodiment of a communications system where a UE accesses circuit switched-based services from a core network node using a fixed wireless terminal. In this embodiment, the FWT 12, (rather than the GANC 44), includes an IP security controller 52 which means the basic IP security signaling and operations that occur across the IP backhaul from the FWT 12 to the GANC 44 in the earlier embodiments shown in FIGS. 4 and 5 are consolidated to providing and then using a secure IP connection between the UE 38 and FWT 12. The FWT 12 also provides the remaining part of the IP connection from the FWT 12 to the PS access network 42 and then the GANC 44, but this remaining part does not need to be secured by IPsec because mobile network air interface encryption is typically already applied between the FWT 12 and the PS Access Network 42.

FIG. 7 is a non-limiting flowchart illustrating example procedures where a UE accesses circuit switched-based services from a core network node using a fixed wireless terminal in accordance with the example embodiment shown in FIG. 6. The FWT 12 receives (and preferably authenticates) a request from the UE 38 for CS-mobile telephony CN service (step S10) and then provides a secure connection between the UE and the FWT and an IP connection between the FWT and a GANC via a PS access network to provide the UE access to CS CN telephony service (step S12). Thereafter, the FWT 12 routes CS-mobile telephony traffic over the secure connection and the remaining part of the IP connection in accordance with a CS CN telephony service provided to the UE via the FWT (step S14).

In one non-limiting example for the identifying step S10, the UE 38 addresses the FWT as the secure gateway, i.e., the GANC-SEGW IP address given to the UE 38 is the IP address of the FWT. In a second non-limiting example, the FWT is not addressed as the secure gateway, e.g., GANC-SEGW. Instead, the FWT intercepts IPsec tunnel establishment attempts towards specified GANC-SEGWs but acts like a GANC-SEGW towards the UE 38. However, an additional function is needed for this "intercept" example. The FWT preferably does not intercept all IPsec tunnel establishments because some may be for other types of security gateways, e.g., enterprise VPNs. Therefore, the FWT uses a table of GANC-SEGWs IP addresses that it will intercept.

Figure 8:
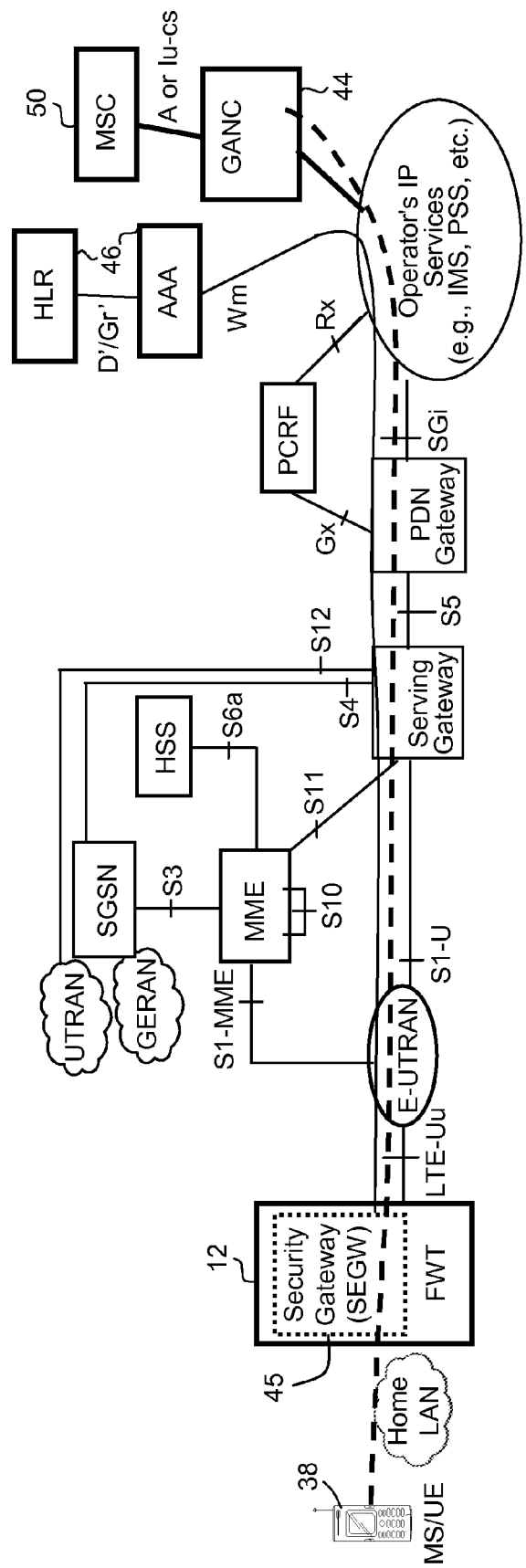
FIG. 8 is a function block diagram showing an example, non-limiting SAE/LTE application of the example embodiment associated with FIGS. 6 and 7.
Figure 9:
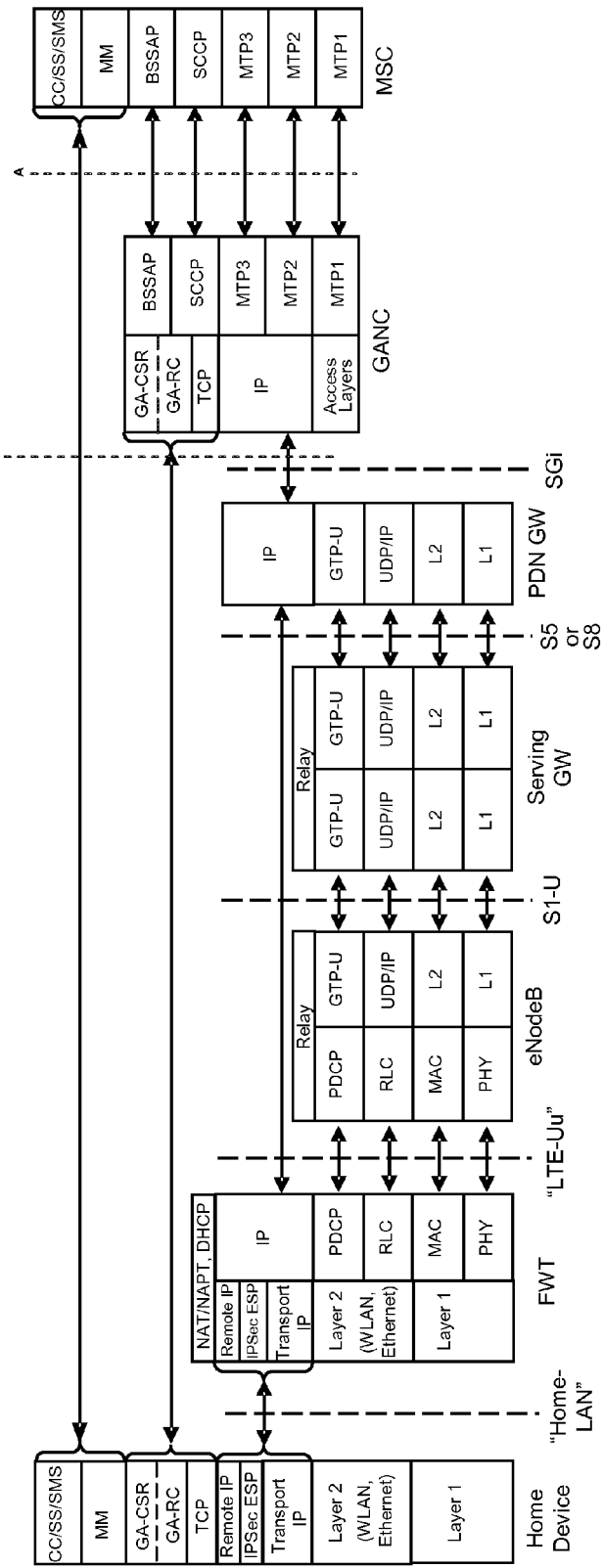
FIG. 9 is a diagram illustrating example protocol stacks associated with the example SAE/LTE application in FIG. 8.

FIG. 8 is a function block diagram showing an example, non-limiting SAE/LTE application of the example embodiment associated with FIGS. 6 and 7. A security gateway (SEGW) is located in the FWT 12, and the dashed line shows the IP connection between the MS/UE 38 and the GANC 44. An SAE/LTE network is shown, but any mobile network technology can be used to provide the needed connectivity, for example, HSPA, eHSPA, CDMA, CDMA2000, WiMAX, etc. FIG. 9 is a diagram illustrating example protocol stacks associated with the example SAE/LTE application in FIG. 8. The GAN protocols and the Up-interface (i.e., the protocol layers GA-CSR, GA-RC and the related TCP layer in FIG. 9) are seen as application protocol layers for the FWT 12 and the SAE/LTE network that provide IP connectivity for the UE 38 and the GANC 44. An example A-interface is shown between the GANC 44 and the circuit-switched, core network telephony node MSC 50? but other suitable interfaces could be used.

The FWT 12 terminates the IPsec tunnel from the UE 38 (shown as "Home Device" in FIG. 9) which allows optimized or least improved transmission over the mobile backhaul between the FWT and the GANC. The FWT 12 also preferably authenticates both the UE request for CN services as well as the IPsec tunnel establishment using, in the example shown in FIGS. 8 and 9, the Wm-interface towards an authentication, authorization, and accounting (AAA) server that is then connected to a mobile subscriber database like the home location register (HLR)/Home Subscriber Server (HSS).

The FWT 12 may provide connectivity to a number of UEs, but that number is relatively small compared to a GANC-SEGW that must support hundreds of thousands of UEs. As a result, the capacity requirements on the FWT-SEGW are also small compared to a normal GANC-SEGW supporting hundreds of thousands of UEs. This is beneficial because the need for a more centralized GANC-SEGW is removed.

The PS access network may need to know when a FWT is being used for security reasons and to not open up direct connectivity to the AAA-server or the GANC 44 from simply any UE connected to the LTE/SAE network. This issue is addressed in the following non-limiting, example embodiment. When the FWT 12 attaches to the network, the FWT may for example create one packet data network (PDN) connection for the authentication signaling between the FWT 12 and the GANC 44 and authentication server, e.g., an AAA, (shown as a solid line in FIG. 8), and another PDN connection for the IP connection between the FWT 12 and GANC 44 (shown as a dashed line in FIG. 8). The FWT 12 may use still an additional PDN connection to provide for example Internet access to devices using the FWT 12 for outside network access. The different PDN connections may be established using any appropriate procedures, e.g., according to known SAE/LTE principles. For example, the UE subscription for a FWT may indicate that the separate PDN connections are to be established and a network-initiated bearer request can be used. Another example alternative is for the FWT to request the different PDN connections using a UE-initiated bearer request also known as "UE requested PDN connectivity".

As one non-limiting SAE/LTE example implementation to let the network know when a FWT is attaching to the network and establishing the PDN connections, the UE subscription belonging to a FWT is marked as "FWT subscription" in the network, e.g., in the HSS/HLR. Alternatively, the FWT indicates as part of the attachment to the network that the "device type" is an "FWT device." The network may then update the HSS/HLR dynamically, i.e., by learning which mobile subscriptions are used for FWT devices.

Figure 10:
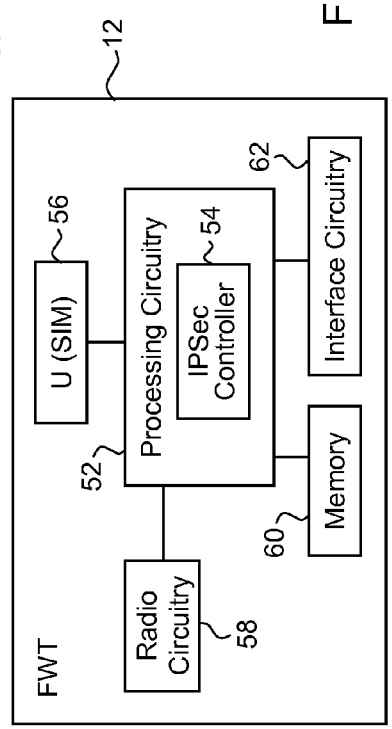
FIG. 10 is a non-limiting function block diagram of an FWT.

FIG. 10 is a non-limiting function block diagram of the FWT 12. Processing circuitry 52 performs the various control tasks of the FWT and may include an IPSec controller 54 for performing IPSec related operations. The processing circuitry 52 is coupled to a U(SIM) card 56, radio circuitry 58, memory 60, and interface circuitry 62. The U(SIM) card 56 is used to authenticate the FWT 12 with the network. The radio circuitry 58 provides radio communications with the UE 38 and the PS access network. Memory 60 stores data and program instructions needed for the FWT operation.

A significant advantage of the technology described in this application is that no changes are needed to the UE 38. For example, a UE implemented according to the 3GPP GAN standard can be used unmodified. Nor are changes required in the GANC 44 or in the MSC 46. If existing GAN network principles are used, for example, to implement CS Domain procedures between the UE and the network (e.g., SEGW, GANC, and MSC), the main difference for those existing GAN network principles is that the secure IP connection, e.g., IPsec tunnel, is established between the UE and the FWT. The FWT preferably authenticates the UE and ensures that the UE is allowed to establish the secure IP connection and to use the GAN 40 in combination with one or more FWTs. If desired, the standardized 3GPP GAN authentication mechanism may be used without modification. Similarly, standardized GAN procedures may be used unmodified between the UE, the GANC, and the MSC including for example the following: (1) GAN Discovery, GAN Registration, GAN Registration Update, GAN Keep Alive procedures, (2) mobility management procedures (for example Location Update) between the MS and the MSC, (3) paging procedures between the MSC, the GANC, and the MS, and (4) connection management (CM) procedures between the MS and the MSC, e.g., call control for both mobile-originated (MO) and mobile-terminated (MT) transactions, short messaging service (SMS), Supplementary Services, etc.

Although the FWT provides direct access to the mobile network PS domain, the principles described above for gaining access to CS services in the CN may be applied to the GAN PS domain. One benefit with using a FWT-GAN PS domain solution is that the UE can keep the same IP point-of-presence (PoP), i.e., IP address, in the PDN-GW (e.g., GGSN) while moving between the mobile network and a home LAN provided by the FWT.

Although various embodiments have been shown and described in detail, the claims are not limited to any particular embodiment or example. None of the above description should be read as implying that any particular element, step, range, or function is essential such that it must be included in the claims scope. The scope of patented subject matter is defined only by the claims. The extent of legal protection is defined by the words recited in the allowed claims and their equivalents. All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the technology described, for it to be encompassed by the present claims. No claim is intended to invoke paragraph 6 of 35 USC §112 unless the words "means for" or "step for" are used. Furthermore, no embodiment, feature, component, or step in this specification is intended to be dedicated to the public regardless of whether the embodiment, feature, component, or step is recited in the claims.

What is claimed is:

1. A method in a fixed wireless terminal (FWT), characterized by:
   identifying a request from a mobile radio user equipment (UE) for a circuit-switched mobile telephony, service provided by a circuit-switched mobile core network;
   authenticating the request;
   in response to the request, providing an internet protocol (IP) connection between the mobile UE and a generic access network controller via a packet-switched (PS) mobile network that includes a radio base station; and
   providing as part of the IP connection a secure IP connection between the FWT and the UE,
   wherein the IP connection and the generic access network controller provide the mobile UE access to the circuit-switched mobile telephony service provided by the circuit-switched mobile core network.

2. The method in claim 1, wherein the FWT includes a secure gateway connected to the secure IP connection with the UE and to a remaining part of the IP connection with the generic access controller.

3. The method in claim 2, wherein the secure IP connection is an IPsec tunnel, and wherein the secure gateway terminates the IPsec tunnel from the mobile UE.

4. The method in claim 3, wherein the secure gateway authenticates the IPsec tunnel.

5. The method in claim 3, wherein the secure gateway determines whether the request corresponds to a request for an IPsec tunnel from the mobile UE to the generic access controller, and if so, the secure gateway provides the IPsec tunnel between the mobile UE and the FWT.

6. The method in claim 2, wherein the secure gateway provides an IP security connection separate from the IF connection from the secure gateway to an authentication server coupled to the packet-switched (PS) mobile network.

7. The method in claim 2, wherein the secure gateway routes data packet traffic between the secure connection and the remaining part of the connection.

8. The method in claim 1, wherein the identifying step is based on the FWT being addressed by the UE as a secure gateway associated with the IP connection with the UE.

9. The method in claim 1, wherein the identifying step is based on the FWT intercepting a request to a secure gateway associated with the IF connection with the UE.

10. The method in claim 1, further comprising prior to providing the IP connection, the FWT performs an attach operation to attach to the packet-switched network in which the FWT identifies itself as an FWT device.

11. The method in claim 1, wherein the packet-switched (PS) mobile network is one that is based on a 2G, 3G, or 4G cellular wireless standard.

12. A fixed wireless terminal (FWT) apparatus, comprising:
    a radio receiver; and
    processing circuitry,
    the FWT apparatus characterized by:
        the radio receiver being configured to identify a request from a mobile radio user equipment (UE) for a circuit-switched mobile telephony, service provided by a circuit-switched mobile core network, and
        the processing circuitry being configured in response to the request, to provide an internet protocol (IP) connection between the mobile UE and a generic access network controller via a packet-switched (PS) mobile network that includes a radio base station, wherein the processing circuitry is configured to authenticate the request, and provide as part of the IP connection a secure IP connection between the FWT and the UE,
    wherein the IP connection and the generic access network controller provide the mobile UE access to the circuit-switched mobile telephony service provided by the circuit-switched mobile core network.

13. The FWT apparatus in claim 12, wherein the processing circuitry includes a secure gateway connected to the secure IP connection with the UE and to a remaining part of the IP connection with the generic access controller.

14. The FWT apparatus in claim 13, wherein the secure IP connection is an IPsec tunnel, and wherein the secure gateway is configured to terminate the IPsec tunnel from the mobile UE.

15. The FWT apparatus in claim 14, wherein the secure gateway is configured to authenticate the IPsec tunnel.

16. The FWT apparatus in claim 14, wherein the secure gateway is configured to determine whether the request corresponds to a request for an IPsec tunnel from the mobile UE to the generic access controller, and if so, the secure gateway is configured to provide the IPsec tunnel between the mobile UE and the FWT.

17. The FWT apparatus in claim 13, wherein the secure gateway is configured to provide an IP security connection separate from the IP connection from the secure gateway to an authentication server coupled to the packet-switched (PS) mobile network.

18. The FWT apparatus in claim 13, wherein the secure gateway is configured to route data packet traffic between the secure connection and the remaining part of the connection.

19. The FWT apparatus in claim 12, wherein the FWT apparatus is configured to be addressed by the UE as a secure gateway associated with the IP connection with the UE.

20. The FWT apparatus in claim 12, wherein the FWT apparatus is configured to intercept a request to a secure gateway associated with the IP connection with the UE.

21. The FWT apparatus in claim 12, wherein the processing circuitry is configured, prior to establishing the IP connection, to perform an attach operation to attach to the packet-switched network in which the FWT identifies itself as an FWT device.

22. The FWT apparatus in claim 12, wherein the packet-switched (PS) mobile network is one that is based on a 2G, 3G, or 4G cellular wireless standard.

23. A fixed wireless terminal (FWT) comprising:
   a radio receiver being configured to identify a request from a mobile radio user equipment (UE) for a circuit-switched mobile telephony, service provided by a circuit-switched mobile core network; and
   processing circuitry being configured in response to the request, to provide an internet protocol (IP) connection between the mobile UE and a generic access network controller via a packet-switched (PS) mobile network that includes a radio base station, wherein the processing circuitry is configured to authenticate the request, and provide as part of the IP connection a secure IP connection between the FWT and the UE,
wherein the IP connection and the generic access network controller provide the mobile UE access to the circuit-switched mobile telephony service provided by the circuit-switched mobile core network.

* * * * *